US008682755B2

(12) United States Patent
Bucholz et al.

(10) Patent No.: US 8,682,755 B2
(45) Date of Patent: Mar. 25, 2014

(54) SYSTEMS AND METHODS FOR DETECTING TAX REFUND FRAUD

(75) Inventors: Andrew John Bucholz, Alexandria, VA (US); Scott M. Straub, Washington, DC (US); Monty Faidley, Kennesaw, GA (US); Johannes Philippus de Villiers Prichard, Boynton Beach, FL (US); Jesse C B D Shaw, Saint Cloud, MN (US); Dermot C. O'Mahony, Washington, DC (US); David Yeschek, Boynton Beach, FL (US); Jennifer Paganacci, Delray Beach, FL (US); Marlene Thorogood, Boca Raton, FL (US); Mark Loizzo, Boca Raton, FL (US)

(73) Assignee: LexisNexis Risk Solutions FL Inc., Boca Raton, FL (US)

( * ) Notice: Subject to any disclaimer, the term of this patent is extended or adjusted under 35 U.S.C. 154(b) by 0 days.

(21) Appl. No.: 13/541,157

(22) Filed: Jul. 3, 2012

(65) Prior Publication Data
US 2014/0012716 A1 Jan. 9, 2014

(51) Int. Cl.
- *G07B 17/00* (2006.01)
- *G07F 19/00* (2006.01)
- *G06Q 20/00* (2012.01)
- *G06F 17/22* (2006.01)

(52) U.S. Cl.
USPC ................... 705/30; 705/19; 705/31

(58) Field of Classification Search
USPC ................................. 705/30, 19, 31
See application file for complete search history.

(56) References Cited

U.S. PATENT DOCUMENTS

| 6,401,066 B1 * | 6/2002 | McIntosh | 704/273 |
| 6,993,502 B1 * | 1/2006 | Gryglewicz et al. | 705/31 |
| 7,251,624 B1 * | 7/2007 | Lee et al. | 705/35 |
| 7,333,635 B2 * | 2/2008 | Tsantes et al. | 382/115 |
| 7,398,925 B2 * | 7/2008 | Tidwell et al. | 235/440 |
| 7,461,258 B2 * | 12/2008 | Rolfe | 713/176 |
| 7,579,965 B2 * | 8/2009 | Bucholz | 340/937 |
| 7,590,572 B2 * | 9/2009 | Larson | 705/31 |
| 7,624,031 B2 * | 11/2009 | Simpson et al. | 705/4 |
| 7,661,585 B2 * | 2/2010 | Joao | 235/379 |
| 7,720,846 B1 * | 5/2010 | Bayliss | 707/736 |
| 7,769,738 B2 * | 8/2010 | Ramberg | 707/706 |

(Continued)

OTHER PUBLICATIONS

Continious Fraud Detection in Enterprise systems by Best PeterJ; Rikhardsson, Toleman, The Journal of Digital Forensis: JDFSL 4.1 (2009): 39-60.*

*Primary Examiner* — Matthew Gart
*Assistant Examiner* — Harshad Parikh
(74) *Attorney, Agent, or Firm* — Mark Lehi Jones; Ryan A. Schneider, Esq.; Troutman Sanders LLP

(57) ABSTRACT

Certain embodiments of the disclosed technology may include systems and methods for detecting tax refund fraud. According to an exemplary embodiment of the disclosed technology, a method is provided for detecting tax refund fraud. The method includes receiving entity-supplied information. In an exemplary embodiment, the entity-supplied information includes at least a name, social security number, and mailing address. The method further includes querying one or more databases with the entity-supplied information and receiving a plurality of independent information in response to the querying. The method can include determining, based at least in part on a comparison of the entity-supplied information with the plurality of independent information, zero or more indicators of fraud. The method can include outputting the zero or more indicators of fraud.

18 Claims, 5 Drawing Sheets

(56) References Cited

U.S. PATENT DOCUMENTS

| | | |
|---|---|---|
| 7,779,456 B2* | 8/2010 | Dennis et al. ............... 726/7 |
| 7,904,337 B2* | 3/2011 | Morsa ..................... 705/14.71 |
| 7,905,396 B2* | 3/2011 | Tidwell et al. ............. 235/379 |
| 7,937,319 B2* | 5/2011 | Kennis et al. .............. 705/38 |
| 8,055,518 B2* | 11/2011 | Prieston ..................... 705/4 |
| 8,176,044 B2* | 5/2012 | Edala et al. ............... 707/723 |
| 8,306,970 B2* | 11/2012 | Drubner .................... 707/722 |
| 8,423,434 B2* | 4/2013 | Ramsey et al. ............. 705/31 |
| 2003/0115459 A1* | 6/2003 | Monk ....................... 713/168 |
| 2004/0111377 A1* | 6/2004 | Teberg et al. ............... 705/74 |
| 2005/0033690 A1* | 2/2005 | Antognini et al. .......... 705/40 |
| 2005/0096989 A1* | 5/2005 | Ostlund .................... 705/19 |
| 2005/0285721 A1* | 12/2005 | Bucholz et al. ......... 340/426.1 |
| 2006/0245622 A1* | 11/2006 | Tedesco et al. ........... 382/115 |
| 2007/0208681 A1* | 9/2007 | Bucholz ..................... 706/47 |
| 2007/0213992 A1* | 9/2007 | Anderson et al. ............ 705/1 |
| 2009/0187500 A1* | 7/2009 | Wilson et al. .............. 705/31 |
| 2010/0241558 A1* | 9/2010 | Chmielewski et al. ....... 705/38 |
| 2010/0332362 A1* | 12/2010 | Ramsey et al. ............. 705/31 |
| 2011/0047628 A1* | 2/2011 | Viars ......................... 726/28 |
| 2011/0131052 A1* | 6/2011 | Bucholz .................... 705/1.1 |
| 2011/0191335 A1* | 8/2011 | Miller et al. ............... 707/728 |
| 2012/0030080 A1* | 2/2012 | Slater et al. ............... 705/35 |
| 2012/0130853 A1* | 5/2012 | Petri et al. .............. 705/26.35 |
| 2012/0197771 A1* | 8/2012 | Wilson et al. .............. 705/31 |
| 2012/0197879 A1* | 8/2012 | Edala et al. ............... 707/723 |
| 2012/0226591 A1* | 9/2012 | Ramsey et al. ............. 705/31 |
| 2012/0296925 A1* | 11/2012 | Mehra et al. .............. 707/758 |
| 2013/0060809 A1* | 3/2013 | Drubner .................... 707/769 |
| 2013/0218797 A1* | 8/2013 | Prichard et al. ............ 705/325 |

\* cited by examiner

SYSTEMS AND METHODS FOR DETECTING TAX REFUND FRAUD

FIELD

The disclosed technology generally relates to detecting fraud, and in particular, to systems and methods for detecting tax refund fraud.

BACKGROUND

Federal and state revenue departments in the United States face a number of problems associated with fraudulent income tax returns. Fraudsters can apply for tax refunds by misrepresenting their identity, by stealing and using identity information from another individual, or by using an identity of a deceased person. The associated revenue loss to the federal and state can be significant, and the process of verifying the legitimacy returns can create costly delays.

Technically well-informed fraud perpetrators with sophisticated deception schemes are likely to continue targeting tax revenue entities, particularly if fraud detection and prevention mechanisms are not in place. Balancing the threats of identity fraud with efficient service for legitimate refunds creates a significant challenge for federal and state revenue departments.

BRIEF SUMMARY

Some or all of the above needs may be addressed by certain embodiments of the disclosed technology. Certain embodiments of the disclosed technology may include systems and methods for detecting tax refund fraud.

According to an exemplary embodiment of the disclosed technology, a method is provided for detecting tax refund fraud. The method includes receiving entity-supplied information. In an exemplary embodiment, the entity-supplied information includes at least a name, social security number, and mailing address. The method further includes querying one or more databases with the entity-supplied information and receiving a plurality of independent information in response to the querying. The plurality of independent information can include one or more of an indication of whether or not the entity is deceased; independent address information associated with the entity; address validity information associated with the entity-supplied information; one or more public records associated with the entity-supplied information; or no information.

According to an exemplary embodiment, the method can include determining, based at least in part on a comparison of the entity-supplied information with the plurality of independent information, zero or more indicators of fraud. According to certain exemplary embodiments, the indicators of fraud can include one or more of an entity deceased within tax year or died within a timeframe of the tax year that would indicate a possible non-fraud tax refund request with no record of association between the entity-supplied mailing address and the independent address information; entity-supplied mailing address is invalid with no record of association between a zip code of the entity-supplied mailing address and one or more zip codes associated with the independent address information; no record of association between the entity-supplied mailing address and any independent address information; relatives address or associates address. The method can include outputting the zero or more indicators of fraud.

According to an exemplary embodiment of the disclosed technology, another method is provided for detecting tax refund fraud. The method can include receiving entity-supplied information. The entity-supplied information can include at least a name and a social security number. The method includes querying one or more public records with the entity-supplied information. The method includes receiving, based at least on the querying, public data that can include one or more of a second social security number associated with entity-supplied name, a second name associated with the entity-supplied social security number, or a name variant associated with the entity-supplied social security number. The method can include querying a Do Not Pay list with one or more combinations of the entity-supplied information and the received public data, and outputting a fraud alert if the one or more combinations result in a match with at least one record in the Do Not Pay list.

According to another exemplary embodiment, a system is provided for detecting tax refund fraud. The system includes at least one memory for storing data and computer-executable instructions; and at least one processor configured to access the at least one memory and further configured to execute the computer-executable instructions to receive entity-supplied information. The entity-supplied information includes at least a name, social security number, and mailing address. The system can query one or more databases with the entity-supplied information. The system can receive a plurality of independent information in response to the querying. The plurality of independent information can include one or more of an indication of whether or not the entity is deceased, independent address information associated with the entity; address validity information associated with the entity-supplied information, one or more public records associated with the entity-supplied information, or no information. The system can determine, based at least in part on a comparison of the entity-supplied information with the plurality of independent information, zero or more indicators of fraud. The indicators of fraud can include an entity deceased within tax year or died within a timeframe of the tax year that would indicate a possible non-fraud tax refund request with no record of association between the entity-supplied mailing address and the independent address information. The indicators of fraud can include an entity-supplied mailing address that is invalid with no record of association between a zip code of the entity-supplied mailing address and one or more zip codes associated with the independent address information. The indicators of fraud can include no record of association between the entity-supplied mailing address and any independent address information; relatives address or associates address. The system can also output the zero or more indicators of fraud.

According to another exemplary embodiment, a system is provided for detecting tax refund fraud. The system includes at least one memory for storing data and computer-executable instructions; and at least one processor configured to access the at least one memory and further configured to execute the computer-executable instructions to receive entity-supplied information. The entity-supplied information can include at least a name and a social security number. The system can query one or more public records with the entity-supplied information, and receive, based at least on the querying, public data comprising one or more of a second social security number associated with entity-supplied name, a second name associated with the entity-supplied social security number, or a name variant associated with the entity-supplied social security number. The system can query a Do Not Pay list with one or more combinations of the entity-supplied information and the received public data and output a fraud alert if the one or more combinations result in a match with at least one record in the Do Not Pay list.

Exemplary embodiments of the disclosed technology can include one or more computer readable media comprising computer-executable instructions that, when executed by one or more processors, configure the one or more processors to perform a method. The method includes receiving entity-supplied information. In an exemplary embodiment, the entity-supplied information includes at least a name, social security number, and mailing address. The method further includes querying one or more databases with the entity-supplied information and receiving a plurality of independent information in response to the querying. The plurality of independent information can include one or more of an indication of whether or not the entity is deceased; independent address information associated with the entity; address validity information associated with the entity-supplied information; one or more public records associated with the entity-supplied information; or no information. According to an exemplary embodiment, the method can include determining, based at least in part on a comparison of the entity-supplied information with the plurality of independent information, zero or more indicators of fraud. According to certain exemplary embodiments, the indicators of fraud can include one or more of an entity deceased within tax year or died within a timeframe of the tax year that would indicate a possible non-fraud tax refund request with no record of association between the entity-supplied mailing address and the independent address information; entity-supplied mailing address is invalid with no record of association between a zip code of the entity-supplied mailing address and one or more zip codes associated with the independent address information; no record of association between the entity-supplied mailing address and any independent address information; relatives address or associates address. The method can include outputting the zero or more indicators of fraud.

Exemplary embodiments of the disclosed technology can include one or more computer readable media comprising computer-executable instructions that, when executed by one or more processors, configure the one or more processors to perform a method. The method includes The method can include receiving entity-supplied information. The entity-supplied information can include at least a name and a social security number. The method includes querying one or more public records with the entity-supplied information. The method includes receiving, based at least on the querying, public data that can include one or more of a second social security number associated with entity-supplied name, a second name associated with the entity-supplied social security number, or a name variant associated with the entity-supplied social security number. The method can include querying a Do Not Pay list with one or more combinations of the entity-supplied information and the received public data, and outputting a fraud alert if the one or more combinations result in a match with at least one record in the Do Not Pay list.

Other embodiments, features, and aspects of the disclosed technology are described in detail herein and are considered a part of the claimed disclosed technologys. Other embodiments, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Embodiments of the disclosed technology will be described more fully hereinafter with reference to the accompanying drawings, in which embodiments of the disclosed technology are shown. This disclosed technology may, however, be embodied in many different forms and should not be construed as limited to the embodiments set forth herein; rather, these embodiments are provided so that this disclosure will be thorough and complete, and will fully convey the scope of the disclosed technology to those skilled in the art.

In the following description, numerous specific details are set forth. However, it is to be understood that embodiments of the disclosed technology may be practiced without these specific details. In other instances, well-known methods, structures and techniques have not been shown in detail in order not to obscure an understanding of this description. The term "exemplary" herein is used synonymous with the term "example" and is not meant to indicate excellent or best. References to "one embodiment," "an embodiment," "exemplary embodiment," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Certain embodiments of the disclosed technology may enable detection of tax returns with suspect or fraudulent refund requests. Exemplary embodiments of the disclosed technology may utilize information supplied by the refundee together with information obtained from other sources, such as public or private databases, to determine if the refund request is likely to be fraudulent or legitimate. Various exemplary embodiments of the disclosed technology will now be described with reference to the accompanying figures.

Figure 1:
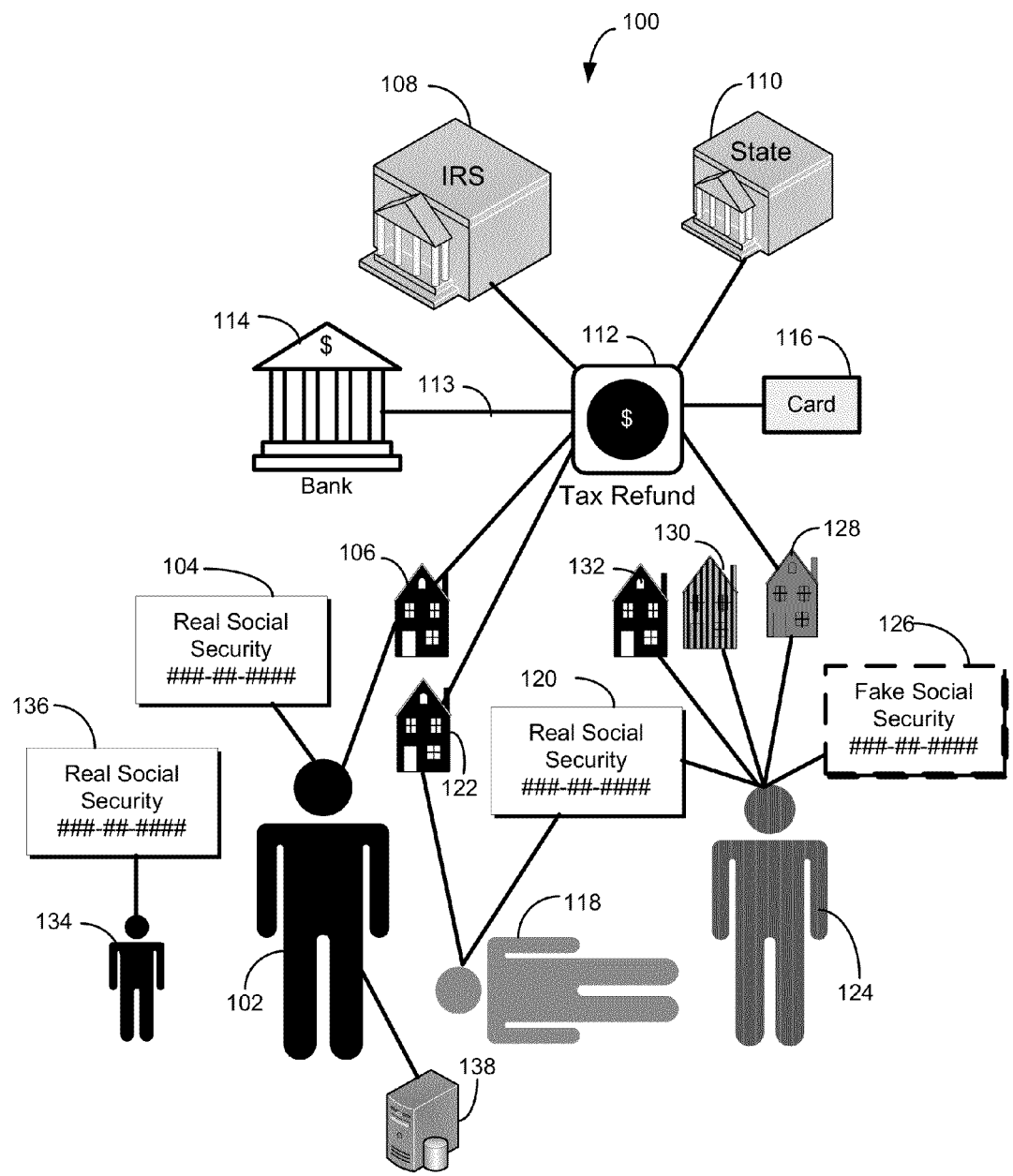
FIG. 1 is a block diagram of illustrative tax refund scenarios, according to exemplary embodiments of the disclosed technology.

FIG. 1 shows a block diagram of illustrative tax refund scenarios, according to exemplary embodiments of the disclosed technology. In a normal tax refund scenario, a legitimate taxpayer 102 may submit a federal tax return to the Internal Revenue Service (IRS) 108 and/or a state return to a particular State Revenue Department 110. The legitimate taxpayer 102 may have a legitimate social security number 104 associated with their name. In certain exemplary embodiments, the legitimate taxpayer 102 may also have a legitimate address 106 associated with their name and/or social security number 104 According to certain exemplary embodiments, one or more databases 138 may be utilized, for example, to verify that the name, social security number 104, and/or address 106 match the identity of the legitimate taxpayer 102. In a typical normal scenario, the legitimate taxpayer 104 may submit the tax refund request with their tax return, and the IRS 108 and/or State Revenue Department 110 may provide the tax refund 112. Accordingly, the tax refund 112 may be dispersed to the legitimate taxpayer 102 by (1) a check mailed to the legitimate address 106; (2) a debit card 116 mailed to the legitimate address 106; or (3) electronic funds transferred 113 to the legitimate taxpayer's 102 bank account 114. In such a scenario, the system may work quickly and efficiently to refund tax overpayment to the legitimate taxpayer 102.

Unfortunately, there exists other scenarios, as depicted in FIG. 1, where a fraudster 124 may apply for a tax refund 112 using misrepresented or stolen identity information. In one exemplary scenario, the fraudster 124 may apply for a tax refund 112 using a social security number 120 and name associated with a deceased person 118. In certain scenarios, the fraudster 124 may open a bank account 114 in the name of the deceased person 118 and request the refund in the form of an electronic deposit 113. In another scenario, the fraudster 124 may request the refund in the form of a debit card. Each of these scenarios may result in the fraudster 124 obtaining the tax refund without having to present positive identification, for example, as is typically needed to cash tax refund checks.

In certain scenarios, the fraudster 124 may actually reside at a first address 132, or even in jail 130, but may submit a tax refund request with a second address 128 to avoid being tracked down. In certain scenarios, the fraudster 124 may provide a fabricated social security number 126 in requesting the refund. In yet another scenario, the fraudster 126 may steal the real social security number 136 associated with a child 134 to obtain a tax refund.

Exemplary embodiments of the disclosed technology may be utilized to detect a potential fraudulent tax refund request, and may be utilized to cancel a refund payment to a potential fraudster 124. Other exemplary embodiments of the disclosed technology may be utilized to detect false positive situations and allow refunds for scenarios that may otherwise be flagged as being suspicious. For example, a legitimate scenario that can appear as fraudulent involves taxable income from a first job. Typically, such taxpayers in this category may be minors with no public record associated with a residence or prior income. Embodiments of the disclosed technology may utilize social security number patterns, blocks, etc., and/or the age of the refundee to determine legitimate tax refund requests.

According to certain exemplary embodiments of the disclosed technology, a potential refundee entity may provide certain entity-supplied information with a tax return or refund request that includes at least a name, social security number, and mailing address. In an exemplary embodiment, one or more databases may be queried with the entity-supplied information. For example, the one or more databases may include public or private databases. In accordance with certain exemplary embodiments, one or more public records may be utilized verify entity-supplied information or retrieve additional information based on the entity-supplied information. According to exemplary embodiments, the public records may include one or more of housing records, vehicular records, marriage records, divorce records, hospital records, death records, court records, property records, incarceration records, or utility records. In exemplary embodiments, the utility records can include one or more of utility hookups, disconnects, and associated service addresses.

According to exemplary embodiments, a plurality of independent information may be received in response to the querying of the public or private database(s). In accordance with exemplary embodiments, the independent information may include, but is not limited to (1) an indication of whether or not the entity is deceased; (2) independent address information associated with the entity; (3) address validity information associated with the entity-supplied information; (3) one or more public records associated with the entity-supplied information; or (4) no information.

Exemplary embodiments of the disclosed technology may make a comparison of the entity-supplied information with the plurality of independent information to determine zero or more indicators of fraud. For example, embodiments of the disclosed technology may compare the entity-supplied information with the plurality of independent information to determine if the entity died within tax year, or if the entity died within a timeframe of the tax year that would indicate a possible non-fraud tax refund request, but with no record of association between the entity-supplied mailing address and the address information obtained via the independent information. Such a scenario may represent a situation where a fraudster 124 has obtained a name and social security information 120 from a deceased person 118, but where the address provided does not correspond with the known residence address 122 of the deceased person 118, or with any known relatives or associates of the deceased person 118. This scenario may be an indicator of a attempt by a fraudster 124 to have a deceased person's 118 tax refund 112 sent to a post office box or other address that can be monitored by the fraudster 124 without any direct tie to the fraudster 124. Exemplary embodiments of the disclosed technology may include a length of time entity has been deceased (if the entity is deceased) in the determination of fraud indicators. For example, a tax refund request listing a person known to be dead for 10 years is very likely a fraudulent refund request.

According to another exemplary embodiment of the disclosed technology, a comparison may be made with the entity-supplied mailing address and the independent information to determine if the entity-supplied mailing address is invalid with no record of association between a zip code of the entity-supplied mailing address and one or more zip codes associated with the independent address information. For example, situations exist where a legitimate taxpayer 102 may abbreviate or include a typographical error their return mailing address, but they may provide a correct zip code that could be verified with the independent information. However, a fraudster 124 may be likely to use a completely different zip code, and in such situations, embodiments of the disclosed technology may utilize the inconsistent zip code information to flag a possible fraudulent tax return request.

According to another exemplary embodiment of the disclosed technology, a comparison may be made with the entity-supplied mailing address and the independent information to determine whether or not there is any record of association between the entity-supplied mailing address and any independent address information, such as the address of a relative, or associate. According to an exemplary embodiment, if there is no association between the entity-supplied mailing address and any independent address information, then there is a high likelihood that the refund request is fraudulent.

In accordance with certain exemplary embodiments of the disclosed technology, fraud false positive indicators may determined, based at least in part on a comparison of the entity-supplied information with the plurality of independent information. Absent of exemplary embodiments of the disclosed technology, certain situations may be incorrectly flagged as fraudulent, and may create costly and unnecessary refund delays. In one exemplary embodiment, a fraud false positive indicator may be based on an analysis to detect if the entity-supplied mailing address is invalid, but with a record of association between a zip code of the entity-supplied mailing address and one or more zip codes associated with the independent address information. This represents a situation where a legitimate taxpayer 102 has abbreviated their address or included a typographical error in the address, but the zip code corresponds with one known to be associated with the legitimate taxpayer 102.

According to another exemplary embodiment, a fraud false positive indicator may be based on the entity-supplied social security number when there is no independent information available. For example, in one exemplary embodiment, the entity-supplied social security number may be checked to determine if it is valid and issued within 3 to 15 years, and the independent information can be checked to see if it includes information. If no independent information is available and if the entity-supplied social security number is valid and issued within 3 to 15 years, then this information may provide an indication that the entity is a minor. In another exemplary embodiment, the social security number may be checked to determine if the entity is at least 24 years old with a valid social security number issued within 3 to 15 years, and the obtained independent information includes no information. In this scenario, exemplary embodiments of the disclosed technology may provide an indication that the entity is an immigrant.

According to exemplary embodiments of the disclosed technology, one or more public or private databases 138 may be accessed to receive independent information. For example, one or more public records may be provide housing records, vehicular records, marriage records, divorce records, hospital records, death records, court records, property records, incarceration records, or utility records. In exemplary embodiments, the utility records may include one or more of utility hookups, disconnects, and associated service addresses. According to exemplary embodiments of the disclosed technology, such public records may be searched by social security number and/or name to provide independent information that can be utilized to verify entity-supplied information. For example, entity-supplied address information can be checked to determine if it corresponds to any addresses of relatives or associates of the entity.

According to certain exemplary embodiments of the disclosed technology, tax refund fraud may be detected by querying a Do Not Pay list with a combination of entity-supplied information and independent information obtained from one or more public records. For example, a person may be listed on a Do Not Pay list for a number of reasons, including being incarcerated, not paying child support, having liens, etc. Persons on the Do Not Pay list may supply an incorrect social security number or a slight misspelling of a name to avoid being matched with the information on the Do Not Pay list. Therefore, exemplary embodiments of the disclosed technology may include receiving entity-supplied information that includes at least a name and a social security number and querying one or more public records with the entity-supplied information. Exemplary embodiments of the disclosed technology may receive, based at least on the querying, public data that includes one or more of a second social security number associated with entity-supplied name, a second name associated with the entity-supplied social security number, or a name variant associated with the entity-supplied social security number. According to exemplary embodiments of the disclosed technology, a Do Not Pay list may be queried with one or more combinations of the entity-supplied information and the received public data and a fraud alert may be output if the one or more combinations result in a match with at least one record in the Do Not Pay list.

According to certain exemplary embodiments, the Do Not Pay list may be queried with one or more combinations of the entity-supplied name and entity-supplied social security number, the entity-supplied name and the second social security number, the second name or name variant and the entity supplied social security number, or the second name or name variant and the second social security number. According to exemplary embodiments, if one of the combinations matches the information on the Do Not Pay list, then a fraud alert may be output.

Figure 2:
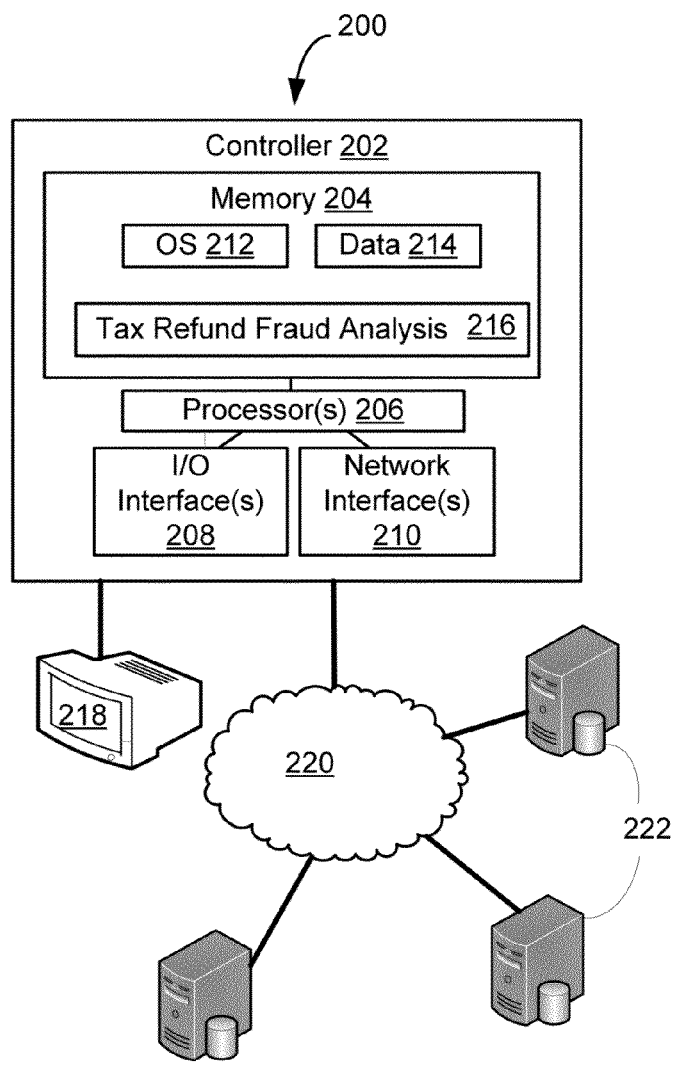
FIG. 2 is a block diagram of an illustrative tax refund fraud detection system 200 according to an exemplary embodiment of the disclosed technology.

FIG. 2 depicts a block diagram of an illustrative tax refund fraud detection system 200 according to an exemplary embodiment of the disclosed technology. The system 200 includes a controller 202 that includes a memory 204, one or more processors 206, an input/out interface 208 for communicating with a local monitor 218 and input devices, and one or more network interfaces 210 for communicating with local or remote servers or databases 222, which may be accessed through a local area network or the internet 220. According to exemplary embodiments, the memory may included an operating system 212, data 214, and one or more tax refund fraud analysis modules 216.

Figure 3:
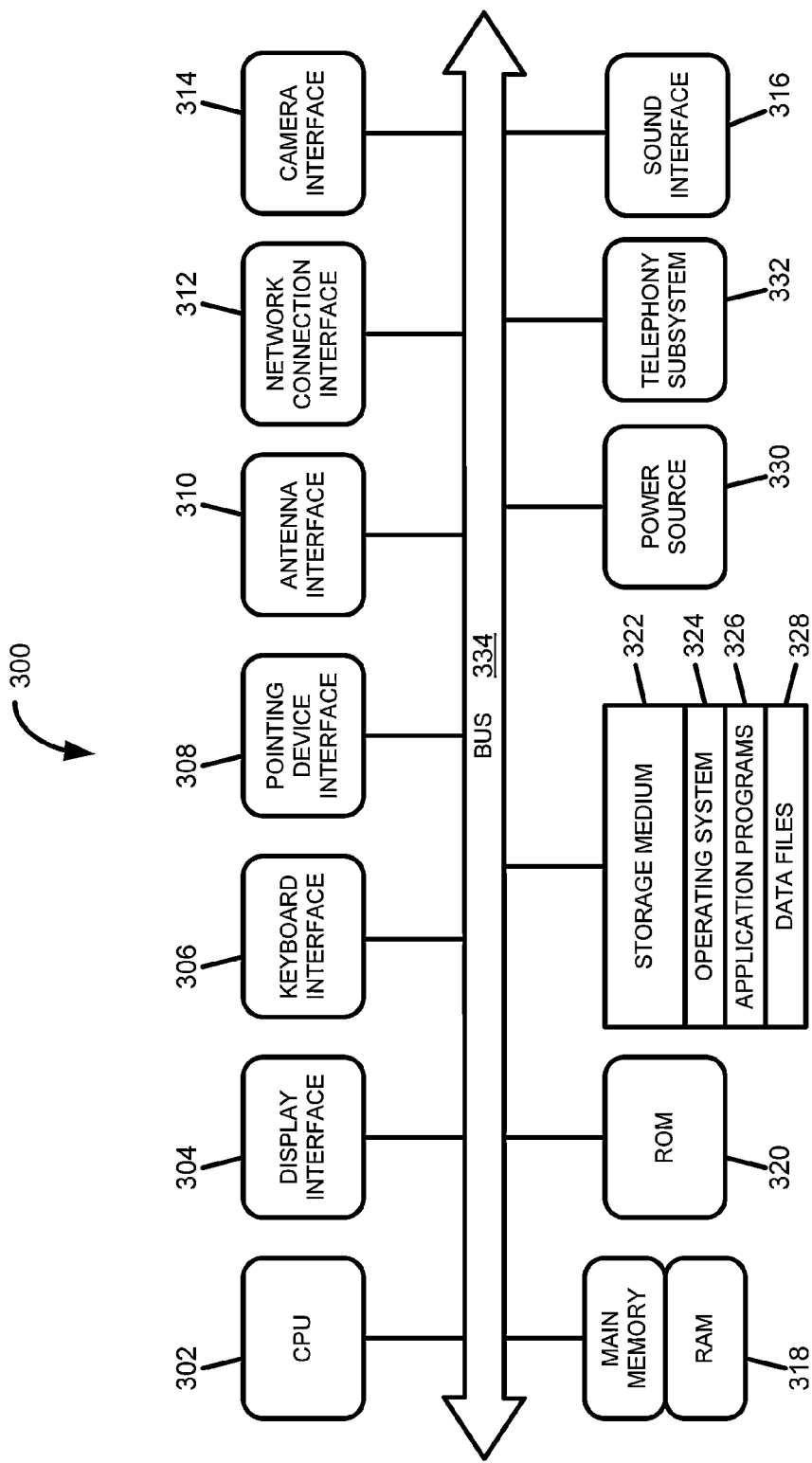
FIG. 3 is a block diagram of an illustrative tax refund fraud detection system architecture 300 according to an exemplary embodiment of the disclosed technology.

Various embodiments of the communication systems and methods herein may be embodied in non-transitory computer readable media for execution by a processor. An exemplary embodiment may be used in an application of a mobile computing device, such as a smartphone or tablet, but other computing devices may also be used. FIG. 3 illustrates schematic diagram of internal architecture of an exemplary mobile computing device 300. It will be understood that the architecture illustrated in FIG. 3 is provided for exemplary purposes only and does not limit the scope of the various embodiments of the communication systems and methods.

FIG. 3 depicts a block diagram of an illustrative computer system architecture 300 according to an exemplary embodiment of the disclosed technology. Certain aspects of FIG. 3 may also be embodied in the controller 202, as shown in FIG. 2. Various embodiments of the communication systems and methods herein may be embodied in non-transitory computer readable media for execution by a processor. It will be understood that the architecture illustrated in FIG. 3 is provided for exemplary purposes only and does not limit the scope of the various embodiments of the communication systems and methods.

The architecture 300 of FIG. 3 includes a central processing unit (CPU) 302, where computer instructions are processed; a display interface 304 that acts as a communication interface and provides functions for rendering video, graphics, images, and texts on the display; a keyboard interface 306 that provides a communication interface to a keyboard; and a pointing device interface 308 that provides a communication interface to a pointing device or touch screen. Exemplary embodiments of the architecture 300 may include an antenna interface 310 that provides a communication interface to an antenna; a network connection interface 312 that provides a communication interface to a network. In certain embodiments, a camera interface 314 is provided that acts as a communication interface and provides functions for capturing digital images from a camera. In certain embodiments, a sound interface 316 is provided as a communication interface for converting sound into electrical signals using a microphone and for converting electrical signals into sound using a speaker. According to exemplary embodiments, a random access memory (RAM) 318 is provided, where computer instructions and data are stored in a volatile memory device for processing by the CPU 302.

According to an exemplary embodiment, the architecture 300 includes a read-only memory (ROM) 320 where invariant low-level systems code or data for basic system functions such as basic input and output (I/O), startup, or reception of keystrokes from a keyboard are stored in a non-volatile memory device. According to an exemplary embodiment, the architecture 300 includes a storage medium 322 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 324, application programs 326 (including, for example, a web browser application, a widget or gadget engine, and or other applications, as necessary) and data files 328 are stored. According to an exemplary embodiment, the architecture 300 includes a power source 330 that provides an appropriate alternating current (AC) or direct current (DC) to power components. According to an exemplary embodiment, the architecture 300 includes and a telephony subsystem 332 that allows the device 300 to transmit and receive sound over a telephone network. The constituent devices and the CPU 302 communicate with each other over a bus 334.

In accordance with exemplary embodiments, the CPU 302 has appropriate structure to be a computer processor. In one arrangement, the computer CPU 302 is more than one processing unit. The RAM 318 interfaces with the computer bus 334 to provide quick RAM storage to the CPU 302 during the execution of software programs such as the operating system application programs, and device drivers. More specifically, the CPU 302 loads computer-executable process steps from the storage medium 322 or other media into a field of the RAM 318 in order to execute software programs. Data is stored in the RAM 318, where the data is accessed by the computer CPU 302 during execution. In one exemplary configuration, the device 300 includes at least 128 MB of RAM, and 256 MB of flash memory.

The storage medium 322 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like, stored on removable and non-removable memory media, to off-load data from the device 300 or to upload data onto the device 300. A computer program product, such as one utilizing a communication system may be tangibly embodied in storage medium 322, which may comprise a machine-readable storage medium.

Figure 4:
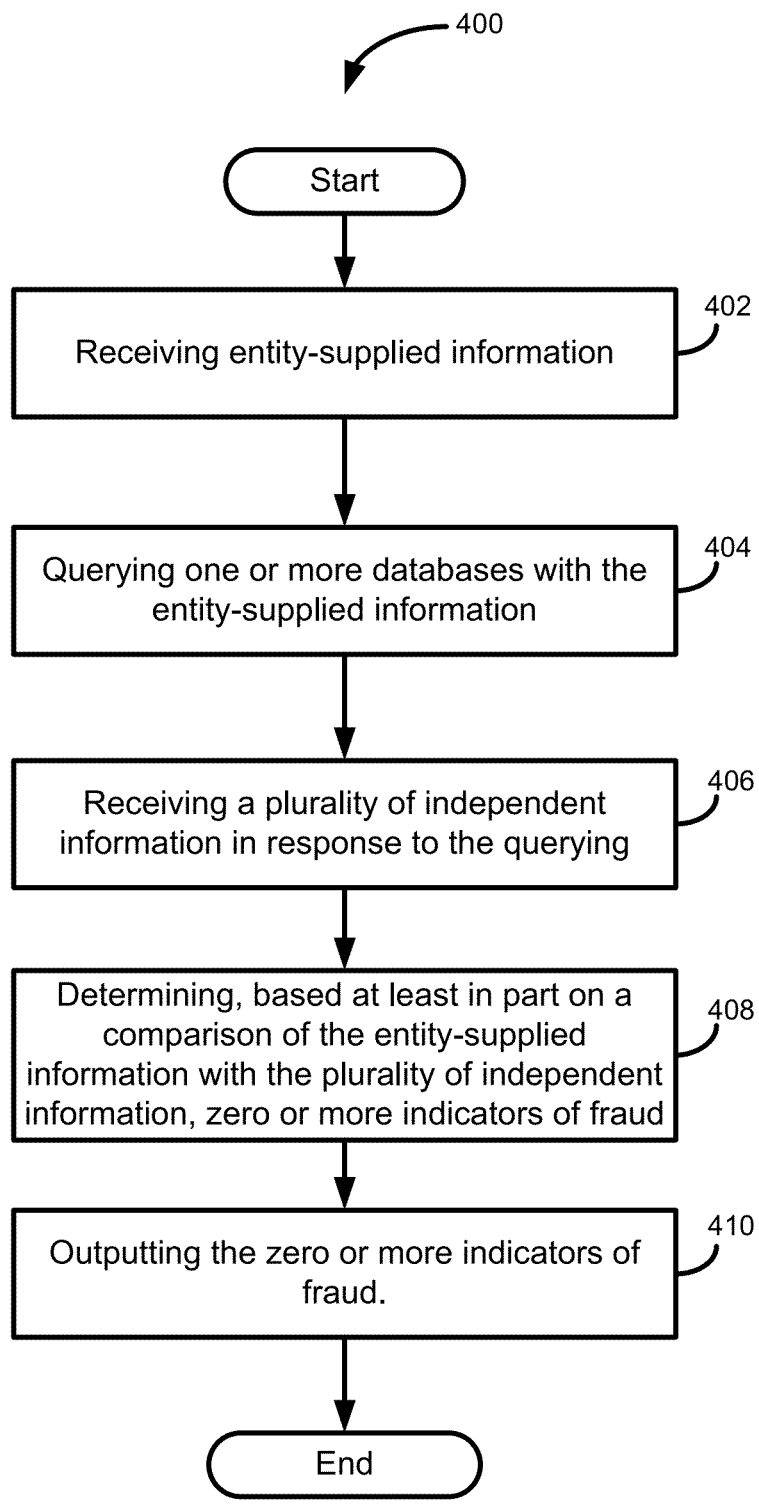
FIG. 4 is a flow diagram of a method 400 according to an exemplary embodiment of the disclosed technology.

An exemplary method 400 for detecting tax refund fraud will now be described with reference to the flowchart of FIG. 4. The method 400 starts in block 402, and according to an exemplary embodiment of the disclosed technology includes receiving entity-supplied information comprising at least a name, social security number, and mailing address. In block 404, the method 400 includes querying one or more databases with the entity-supplied information. In block 406, the method 400 includes receiving a plurality of independent information in response to the querying. In an exemplary embodiment, the plurality of independent information includes one or more of an indication of whether or not the entity is deceased; independent address information associated with the entity; address validity information associated with the entity-supplied information; one or more public records associated with the entity-supplied information; or no information. In block 408, the method 400 includes determining, based at least in part on a comparison of the entity-supplied information with the plurality of independent information, zero or more indicators of fraud. According to exemplary embodiments, the zero or more indicators of fraud can include one or more of an entity deceased within tax year or died within a timeframe of the tax year that would indicate a possible non-fraud tax refund request with no record of association between the entity-supplied mailing address and the independent address information; entity-supplied mailing address is invalid with no record of association between a zip code of the entity-supplied mailing address and one or more zip codes associated with the independent address information; or no record of association between the entity-supplied mailing address and any independent address information; relatives address or associates address; and. In block 410, the method 400 includes outputting the zero or more indicators of fraud. The method 400 ends after block 410.

Figure 5:
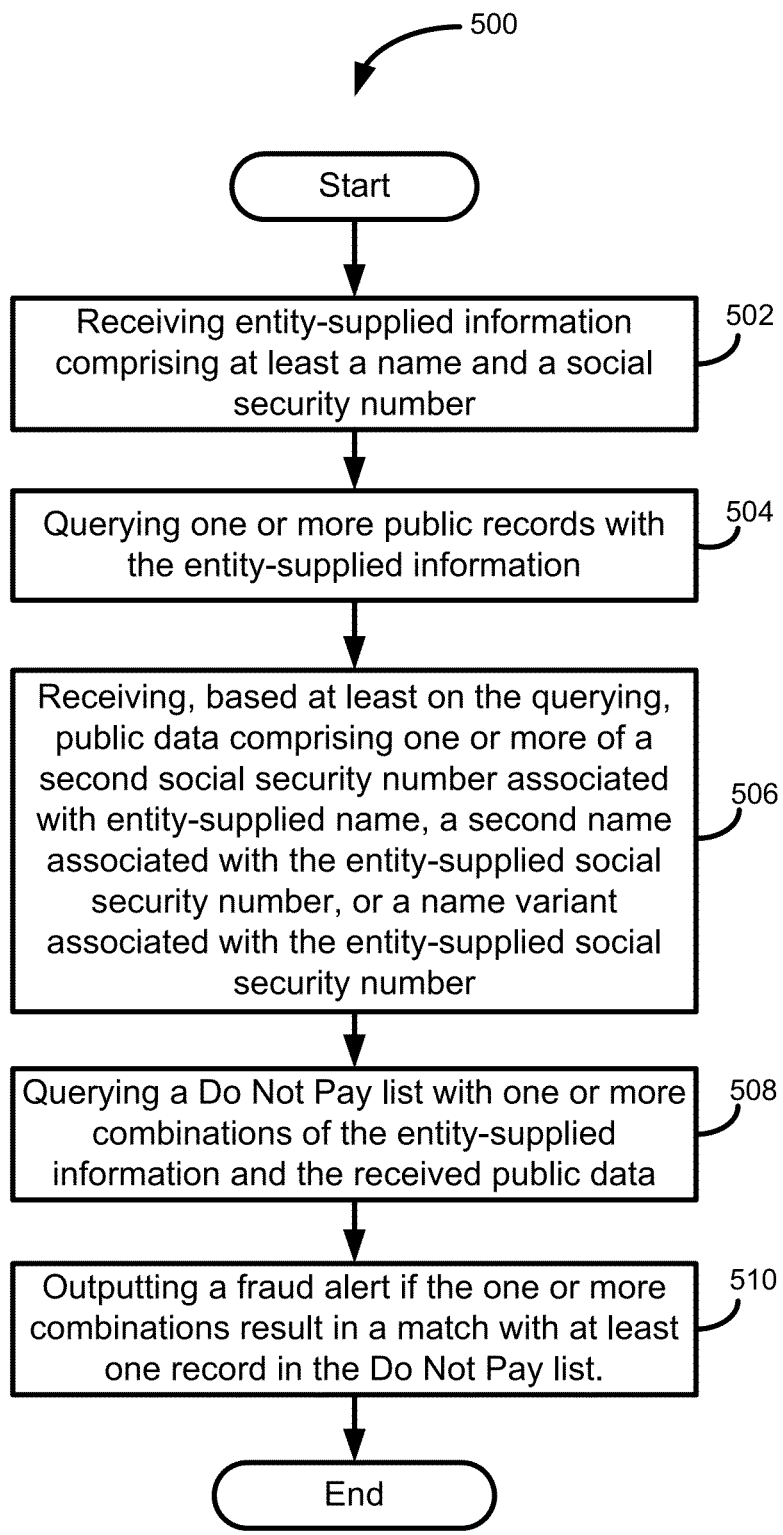
FIG. 5 is a flow diagram of a method 500 according to an exemplary embodiment of the disclosed technology.

Another exemplary method 500 for detecting tax refund fraud will now be described with reference to the flowchart of FIG. 5. The method 500 starts in block 502, and according to an exemplary embodiment of the disclosed technology includes receiving entity-supplied information comprising at least a name and a social security number. In block 504, the method 500 includes querying one or more public records with the entity-supplied information. In block 506, the method 500 includes receiving, based at least on the querying, public data. The public data can include one or more of a second social security number associated with entity-supplied name, a second name associated with the entity-supplied social security number, or a name variant associated with the entity-supplied social security number. In block 508, the method 500 includes querying a Do Not Pay list with one or more combinations of the entity-supplied information and the received public data. In block 510, the method 500 includes outputting a fraud alert if the one or more combinations result in a match with at least one record in the Do Not Pay list. The method 500 ends after block 510.

According to exemplary embodiments, certain technical effects can be provided, such as creating certain systems and methods that detect tax refund fraud. Exemplary embodiments of the disclosed technology can provide the further technical effects of providing systems and methods for determining and eliminating false positives with respect to tax refund fraud, thereby increasing the efficiency of the tax refund systems.

In exemplary embodiments of the disclosed technology, the tax refund fraud detection system 200 and/or the tax refund fraud detection system architecture 300 may include any number of hardware and/or software applications that are executed to facilitate any of the operations. In exemplary embodiments, one or more I/O interfaces may facilitate communication between the tax refund fraud detection system 200 and/or the tax refund fraud detection system architecture 300 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the tax refund fraud detection system 200 and/or the tax refund fraud detection system architecture 300. The one or more I/O interfaces may be utilized to receive or collect data and/or user instructions from a wide variety of input devices. Received data may be processed by one or more computer processors as desired in various embodiments of the disclosed technology and/or stored in one or more memory devices.

One or more network interfaces may facilitate connection of the tax refund fraud detection system 200 and/or the tax refund fraud detection system architecture 300 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ enabled network, a Wi-Fi™ enabled network, a satellite-based network any wired network, any wireless network, etc., for communication with external devices and/or systems.

As desired, embodiments of the disclosed technology may include the tax refund fraud detection system 200 and/or the tax refund fraud detection system architecture 300 with more or less of the components illustrated in FIG. 2 and FIG. 3.

Certain embodiments of the disclosed technology are described above with reference to block and flow diagrams of systems and methods and/or computer program products according to exemplary embodiments of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the disclosed technology have been described in connection with what is presently considered to be the most practical and various embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A computer-implemented method for detecting a tax refund fraud related to an identity misrepresentation, the method comprising:
   receiving entity-supplied information comprising at least a name, a social security number, and a mailing address with a zip code associated with a requested tax refund from a tax agency;
   querying one or more public or private databases with the entity-supplied information, wherein the one or more public or private databases are independent of the tax agency;
   receiving a plurality of independent information in response to the querying, wherein the plurality of independent information includes, as applicable:
      an indication of whether or not the entity is deceased, and a date of death when the entity is indicated as deceased;
      independent address information associated with the entity;
      address validity information associated with the entity-supplied information;
      one or more records associated with the entity-supplied information; or
      no information; and
   determining, with one or more computer processors in communication with a memory, based at least in part on a comparison of the entity-supplied information with at least a portion of the plurality of independent information, indicators of fraud, comprising:

entity deceased within a tax year related to the tax refund or died within a timeframe of the tax year that would indicate a possible non-fraud tax refund request;

the entity-supplied mailing address does not match with any of the independent address information;

the entity-supplied mailing address having no record of association with any independent address information, including addresses of relatives or addresses of associates; and the entity-supplied mailing address includes an entity-supplied zip code having no record of association with one or more zip codes associated with the independent address information;

outputting, for display, zero or more indicators of fraud, wherein zero indicators of fraud correspond to no fraud determined.

2. The method of claim 1, further comprising:

determining, based at least in part on a comparison of the entity-supplied information with the plurality of independent information, zero or more fraud false positive indicators, wherein a false positive indicator corresponds to a legitimate tax refund request that appears fraudulent, the zero or more fraud false positive indicators comprising one or more of:

the entity appears to be a minor based on one or more of the entity-supplied information and the independent information, wherein the entity-supplied social security number is valid and issued within three to fifteen years; or the entity is at least twenty-four years old, and the independent information comprises no information; or the entity-supplied mailing address is invalid with a record of association between a zip code of the entity-supplied mailing address and one or more zip codes associated with the independent address information; and outputting the zero or more fraud false positive indicators.

3. The method of claim 1, wherein, the indication of whether or not the entity is deceased comprises a length of time since the entity has deceased when the entity is indicated as deceased.

4. The method of claim 1, wherein receiving the plurality of independent information comprises receiving the one or more records comprising one or more of housing records, vehicular records, marriage records, divorce records, hospital records, death records, court records, property records, incarceration records, or utility records, wherein the utility records comprise one or more of utility hookups, disconnects, and associated service addresses.

5. The method of claim 1, wherein receiving the independent address information or the address validity information comprises receiving one or more addresses of relatives or associates of the entity.

6. A computer-implemented method for detecting a tax refund fraud related to an identity misrepresentation, the method comprising:

receiving entity-supplied information comprising at least a name and a social security number associated with a requested tax refund from a tax agency;

querying one or more public or private databases record with the entity-supplied information, wherein the one or more public or private databases are independent of the tax agency;

receiving, based at least on the querying of the one or more public or private databases, data comprising one or more of a second social security number associated with the entity-supplied name, a second name associated with the entity-supplied social security number, or a name variant associated with the entity-supplied social security number;

querying an accessible Do Not Pay list with one or more combinations of the entity-supplied information and the received public or private data; and outputting a fraud alert when the one or more combinations result in a match with at least one record in the Do Not Pay list.

7. The computer-implemented method of claim 6, wherein querying the Do Not Pay list with one or more combinations comprises querying the Do Not Pay list with one or more of the entity-supplied name and the entity-supplied social security number, the entity-supplied name and the second social security number, the second name or the name variant and the entity supplied social security number, or the second name or the name variant and the second social security number.

8. A system comprising:

at least one memory for storing data and computer-executable instructions; and at least one processor configured to access the at least one memory and further configured to execute the computer-executable instructions to:

receive entity-supplied information comprising at least a name, a social security number, and a mailing address with a zip code associated with a requested tax refund from a tax agency;

query one or more public or private databases with the entity-supplied information, wherein the one or more public or private databases are independent of the tax agency;

receive a plurality of independent information in response to the querying, wherein the plurality of independent information includes, as applicable:

an indication of whether or not the entity is deceased, and a date of death when the entity is indicated as deceased;

independent address information associated with the entity;

address validity information associated with the entity-supplied information;

one or more records associated with the entity-supplied information; or no information; and determine, with one or more computer processors in communication with a memory, based at least in part on a comparison of the entity-supplied information with at least a portion of the plurality of independent information, indicators of fraud, comprising:

entity deceased within a tax year related to the tax refund or died within a timeframe of the tax year that would indicate a possible non-fraud tax refund request;

the entity-supplied mailing address does not match with any of the independent address information;

the entity-supplied mailing address having no record of association with any independent address information, including addresses of relatives or addresses of associates; and the entity-supplied mailing address includes an entity-supplied zip code having no record of association with one or more zip codes associated with the independent address information; and output, for display, zero or more indicators of fraud, wherein zero indicators of fraud correspond to no fraud determined.

9. The system of claim 8, wherein the at least one processor is further configured to execute the computer-executable instructions to:
  determine, based at least in part on a comparison of the entity-supplied information with the plurality of independent information, zero or more fraud false positive indicators, wherein a false positive indicator corresponds to a legitimate tax refund request that appears fraudulent, the zero or more fraud false positive indicators comprising one or more of:
    the entity appears to be a minor based on one or more of the entity-supplied information and the independent information, wherein the entity-supplied social security number is valid and issued within three to fifteen years; or
    the entity is at least twenty-four years old, and the independent information comprises no information; or
    the entity-supplied mailing address is invalid with a record of association between a zip code of the entity-supplied mailing address and one or more zip codes associated with the independent address information; and
  output the zero or more fraud false positive indicators.

10. The system of claim 8, wherein, the indication of whether or not the entity is deceased comprises a length of time since the entity has deceased when the entity is indicated as deceased.

11. The system of claim 8, wherein the plurality of independent information comprises one or more of housing records, vehicular records, marriage records, divorce records, hospital records, death records, court records, property records, incarceration records, or utility records, wherein the utility records comprise one or more of utility hookups, disconnects, and associated service addresses.

12. The system of claim 8, wherein the independent address information or the address validity information comprises one or more addresses of relatives or addresses of associates of the entity.

13. A system comprising:
  at least one memory for storing data and computer-executable instructions; and at least one processor configured to access the at least one memory and further configured to execute the computer-executable instructions to:
    receive entity-supplied information comprising at least a name and a social security number associated with a requested tax refund from a tax agency;
    query one or more public or private databases with the entity-supplied information, wherein the one or more public or private databases are independent of the tax agency;
    receive, based at least on the querying of the one or more public or private databases, data comprising one or more of a second social security number associated with the entity-supplied name, a second name associated with the entity-supplied social security number, or a name variant associated with the entity-supplied social security number;
    query an accessible Do Not Pay list with one or more combinations of the entity-supplied information and the received public or private data; and
    output a fraud alert when the one or more combinations result in a match with at least one record in the Do Not Pay list.

14. The system of claim 13, wherein the one or more combinations of the entity-supplied information and the received public data comprises one or more of the entity-supplied name and the entity-supplied social security number, the entity-supplied name and the second social security number, the second name or name variant and the entity supplied social security number, or the second name or the name variant and the second social security number.

15. One or more computer readable media comprising computer-executable instructions that, when executed by one or more processors, configure the one or more processors to:
  receive entity-supplied information comprising at least a name, a social security number, and a mailing address with a zip code associated with a requested tax refund from a tax agency;
  query one or more public or private databases with the entity-supplied information, wherein the one or more public or private databases are independent of the tax agency;
  receive a plurality of independent information in response to the querying, wherein the plurality of independent information includes, as applicable:
    an indication of whether or not the entity is deceased, and a date of death when the entity is indicated as deceased;
    independent address information associated with the entity;
    address validity information associated with the entity-supplied information;
    one or more records associated with the entity-supplied information; or
    no information; and
  determine, with one or more computer processors in communication with a memory, based at least in part on a comparison of the entity-supplied information with at least a portion of the plurality of independent information, indicators of fraud comprising:
    entity deceased within a tax year related to the tax refund or died within a timeframe of the tax year that would indicate a possible non-fraud tax refund request;
    the entity-supplied mailing address does not match with any of the independent address information;
    the entity-supplied mailing address having no record of association with any independent address information, including addresses of relatives or addresses of associates; and
    the entity-supplied mailing address includes an entity-supplied zip code having no record of association with one or more zip codes associated with the independent address information;
  and
  output, for display, zero or more indicators of fraud, wherein zero indicators of fraud correspond to no fraud determined.

16. The computer readable media of claim 15, further comprising computer-executable instructions that, when executed by one or more processors, configure the one or more processors to:
  determine, based at least in part on a comparison of the entity-supplied information with the plurality of independent information, zero or more fraud false positive indicators, wherein a false positive indicator corresponds to a legitimate tax refund request that appears fraudulent, the zero or more fraud false positive indicators comprising one or more of:
    the entity appears to be a minor based on one or more of the entity-supplied information and the independent information, wherein the entity-supplied social security number is valid and issued within three to fifteen years; or the entity is at least twenty-four years old, and the independent information comprises no information; or the entity-supplied mailing address is invalid with a record of association between a zip code of the entity-supplied mailing address and one or more zip codes associated with the independent address information; and output the zero or more fraud false positive indicators.

17. One or more computer readable media comprising computer-executable instructions that, when executed by one or more processors, configure the one or more processors to:

receive entity-supplied information comprising at least a name and a social security number associated with a requested tax refund from a tax agency;

query one or more public or private databases with the entity-supplied information wherein the one or more public or private databases are independent of the tax agency;

receive, based at least on the querying of the one or more public or private databases, data comprising one or more of a second social security number associated with entity-supplied name, a second name associated with the entity-supplied social security number, or a name variant associated with the entity-supplied social security number;

query an accessible Do Not Pay list with one or more combinations of the entity-supplied information and the received public or private data; and output a fraud alert when the one or more combinations result in a match with at least one record in the Do Not Pay list.

18. The computer readable media of claim 17, wherein the one or more combinations of the entity-supplied information and the received data comprises one or more of the entity-supplied name and the entity-supplied social security number, the entity-supplied name and the second social security number, the second name or the name variant and the entity supplied social security number, or the second name or the name variant and the second social security number.

* * * * *